United States Patent

Wakabayashi

[11] Patent Number: 5,347,332
[45] Date of Patent: Sep. 13, 1994

[54] FILM CARTRIDGE DRIVING MECHANISM OF A CAMERA

[75] Inventor: Tsutomu Wakabayashi, Yokohama, Japan

[73] Assignee: Nikon Corporation, Tokyo, Japan

[21] Appl. No.: 920,883

[22] Filed: Jul. 28, 1992

[30] Foreign Application Priority Data

Aug. 2, 1991 [JP] Japan .................. 3-216321
Oct. 15, 1991 [JP] Japan .................. 3-296361

[51] Int. Cl.$^5$ .......................... G03B 1/18; G03B 17/26
[52] U.S. Cl. .......................... 354/173.1; 354/275
[58] Field of Search .................. 354/288, 275, 173.1

[56] References Cited

U.S. PATENT DOCUMENTS

| | | | |
|---|---|---|---|
| 4,318,603 | 3/1982 | Daitoku tet al. | 354/214 |
| 4,324,470 | 4/1982 | Terunuma | 354/288 X |
| 4,401,379 | 8/1983 | Tamamura et al. | 354/288 X |
| 4,647,170 | 3/1987 | Stoneham | 354/288 X |
| 4,832,275 | 5/1989 | Robertson | 242/71.1 |
| 4,841,319 | 6/1989 | Hansen | 354/275 |
| 5,079,579 | 1/1992 | Pagano et al. | 354/288 |

FOREIGN PATENT DOCUMENTS 57-60121 4/1982 Japan .
60-140938 9/1985 Japan .
2-29033 2/1990 Japan .

*Primary Examiner*—Michael L. Gellner
*Assistant Examiner*—Jae N. Noh
*Attorney, Agent, or Firm*—Shapiro and Shapiro

[57] ABSTRACT

A film cartridge driving mechanism of a camera, comprises: a spool driving member, capable of engagement with a spool shaft of a cartridge loaded, for rotating the spool shaft; and a power transmitting member for transmitting a driving force of a motor to the spool driving member, the spool driving member having an engaging part capable of engagement with the spool shaft, a locating part for locating the engaging part in a predetermined position with respect to a camera body, a biasing member for effecting a bias so that the locating part engages with the camera body to thereby set the engaging part normally in the predetermined position, and a centering part, forced by the spool shaft of the cartridge as the film cartridge is loaded, for moving the locating part with resistance to the biasing and simultaneously centering the engaging part with respect to the spool shaft by shifting the engaging part in the radial direction thereof.

14 Claims, 13 Drawing Sheets

FILM CARTRIDGE DRIVING MECHANISM OF A CAMERA

BACKGROUND OF THE INVENTION

1. Field of the Invention

The present invention relates to a cartridge driving mechanism of a camera which rotates a spool shaft of a cartridge loaded and, more particularly, to a mechanism for preventing a loading mistake attributed to an eccentricity of the spool shaft, etc.

2. Related Background Art

U.S. Pat. No. 4,832,275 discloses the following film cartridge.

This cartridge is constructed in such a way that a film, accommodated in a body while being wound on a spool shaft, is fed out of the body by causing forward rotations of this spool shaft with a driving member of a camera and rewound inwardly of the body by causing reverse rotations thereof. Then, even the tip of the film is accommodated in the body. This type of cartridge is simple to deal with, because the film tip is not exposed to the outside, and there is no possibility in which the film is incautiously pulled out of the cartridge. When loading such a cartridge into the camera, there is eliminated a necessity for such an operation as to pull out the film with a hand and wind it on a take-up spool of a camera as done in the conventional cartridge. Hence, a system (hereinafter referred to as a drop-in load system) is convenient, wherein a cartridge loading hole is formed in the bottom surface of camera, and the cartridge is loaded in the vertical direction via the loading hole.

By the way, rotating the spool shaft of the cartridge loaded by such a drop-in load system involves a step of engaging the spool shaft with a driving member on the camera side. If this engagement is not correctly performed, it is impossible to feed the film.

However, in the above-mentioned cartridge, as depicted in FIG. 1 of foregoing U.S. Pat. No. 4,832,275, the cartridge body is divided into two units (because of its being made of synthetic resin). Especially, a member for holding the spool shaft is divided into two parts. For this reason, it is difficult to accurately hold a central position of the spool shaft with respect to the body. A large fluctuation in the central position of the spool shaft is consequently caused during manufacture. As described above, if the central position of the spool shaft fluctuates largely, the center of the driving member of camera does not coincide with the center of the spool shaft, and they do not engage with each other when loading the cartridge into the camera by the aforementioned drop-in system. There exists a great possibility in which the film can not be fed.

As a measure for preventing this, it can be considered to give a degree of freedom by making an outside diameter of the engaging part of the driving member smaller by an eccentricity presumed than an inside diameter of the engaging recess of the spool shaft. If the outside diameter of the engaging part is made too small, however, the engagement thereof may not be originally performed. This creates to a possibility in which the rotations of the driving member can not be transmitted to the spool shaft. In this case, it is also impossible to feed the film.

SUMMARY OF THE INVENTION

It is a general object of the present invention to provide a cartridge driving mechanism of a camera, wherein even if the center of a driving member of the camera deviates to some extent from the center of a spool shaft, the two components can be surely engaged with each other.

To this end, according to one aspect of the present invention, there is provided a film cartridge driving mechanism of a camera, comprising: a spool driving means, capable of engagement with a spool shaft of a cartridge loaded, for rotating the spool shaft; and power transmitting means for transmitting a driving force of a motor to the spool driving means, the spool driving means including an engaging part capable of engagement with the spool shaft, locating means for locating the engaging part in a predetermined position with respect to a camera body, biasing means for effecting a bias so that the locating means engages with the camera body to thereby set the engaging part normally in the predetermined position, and centering means, forced by the spool shaft of the cartridge as the film cartridge is loaded, for moving the locating means with resistance to the biasing and simultaneously centering the engaging part with respect to the spool shaft by shifting the engaging part in the radial direction thereof.

According to another aspect of the invention, there is provided a film cartridge driving mechanism of a camera, comprising: a driving member, capable of engagement with a spool shaft of a cartridge loaded, for rotating the spool shaft; a power transmitting member for transmitting a driving force of a motor to the driving member shiftable by a predetermined quantity in the radial direction with respect to the power transmitting member; a biasing means for biasing the driving member so that a rotational center of the driving member coincides substantially with a rotational center of the power transmitting means; and a shaft member, forced by the spool shaft of the cartridge when loading the cartridge, for shifting the driving member in the radial direction up to a position in which the driving member is centered with respect to the spool shaft while resisting the biasing.

BRIEF DESCRIPTION OF THE DRAWINGS

Other objects and advantages of the present invention will become apparent during the following discussion taken in conjunction with the accompanying drawings, in which.

DETAILED DESCRIPTION OF THE PREFERRED EMBODIMENTS

Figure 1:
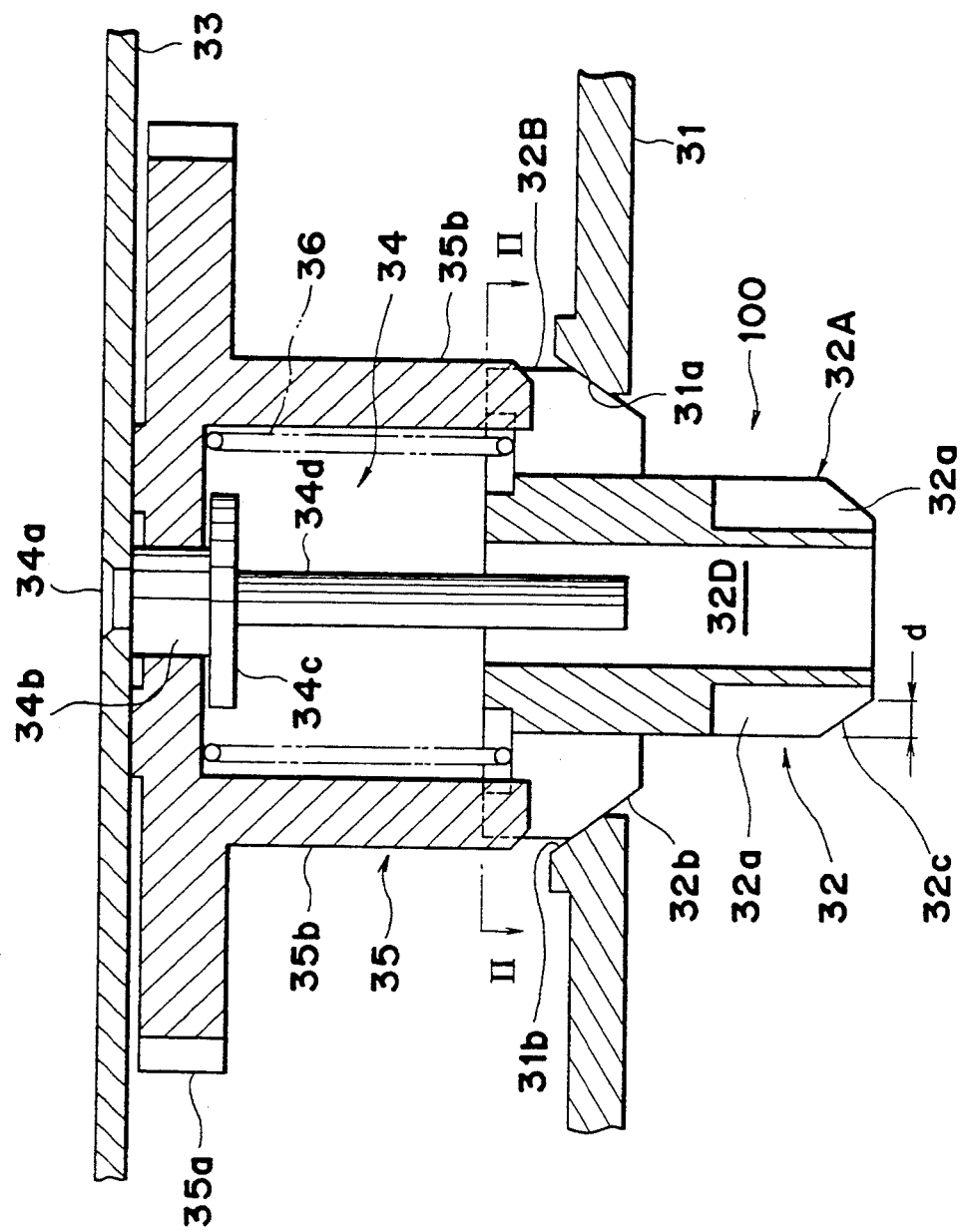
FIG. 1 is a sectional view demonstrating one embodiment of a spool driving mechanism according to the present invention.

A first embodiment of the present invention will be demonstrated with reference to FIGS. 1 through 8.

To start with, an outline of a film cartridge driving mechanism in this embodiment will be explained with reference to FIG. 1.

The present invention is applied to the cartridge driving mechanism of a camera. The cartridge driving mechanism includes a spool driving means 100, capable of engagement with a spool shaft 12 of a cartridge 10 (FIG. 4) loaded therein, for rotating the spool shaft 12 by transmitting rotations to the spool shaft 12 during the engagement. The spool driving means 100 is constructed of: an engaging part 32A capable of engagement with the spool shaft 12; a locating part 32B for locating the engaging member 32A in a predetermining position while engaging with a camera body; a biasing means 36 for effecting a bias to engage the locating member 32B with the camera body; and a centering part 32c which impinges on the spool shaft 12 of the cartridge 10 to be loaded when the engaging part 32A is located in the predetermined position and centers the engaging part 32A with respect to the spool shaft 12 by moving the engaging member 32A in the radial direction thereof when the locating part 32B is moved by the spool shaft 12 with resistance to the above-mentioned biasing.

The cartridge 10 is loaded when the locating part 32B is engaged with the camera body by the biasing means 36 (the engaging part 32A is located). Just then, the spool shaft 12 of the cartridge 10 to be loaded impinges upon the centering part 32c. Then, when the locating member 32B is moved by the cartridge 10 while resisting the above-described biasing, the engaging part 32A is shifted in the radial direction and centered with respect to the spool shaft 12 by means of the centering part 32c impinging on the spool shaft 12. The engaging member 32A is thereby brought into a possible-of-engagement state with the spool shaft 12.

Figure 4:
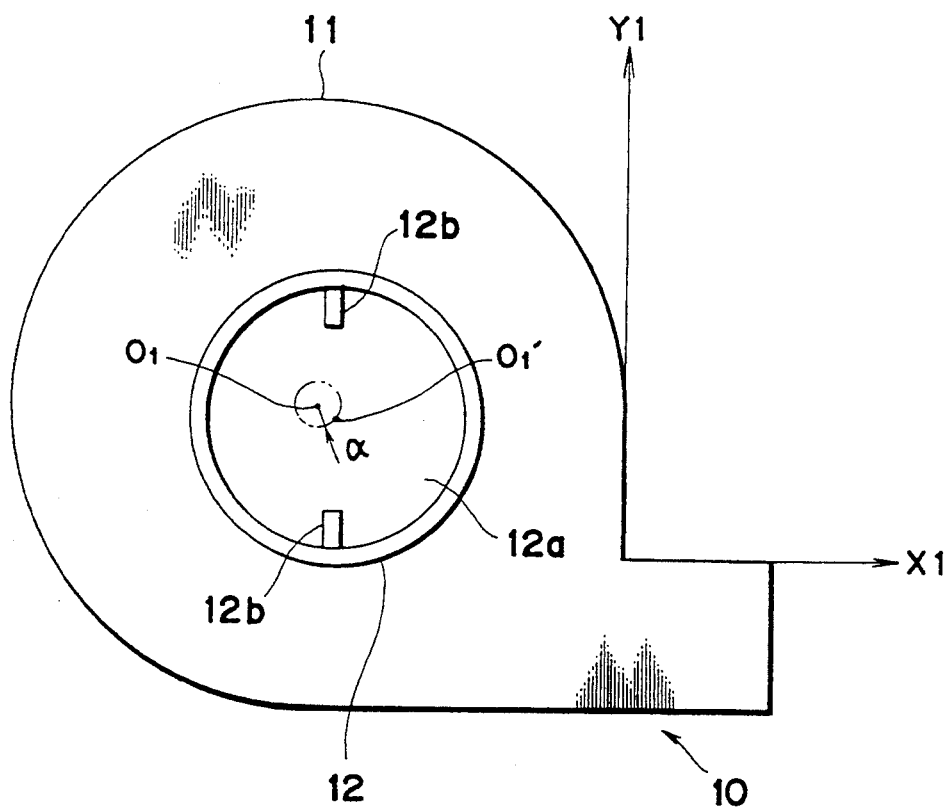
FIG. 4 is a plan view showing a film cartridge.
Figure 6:
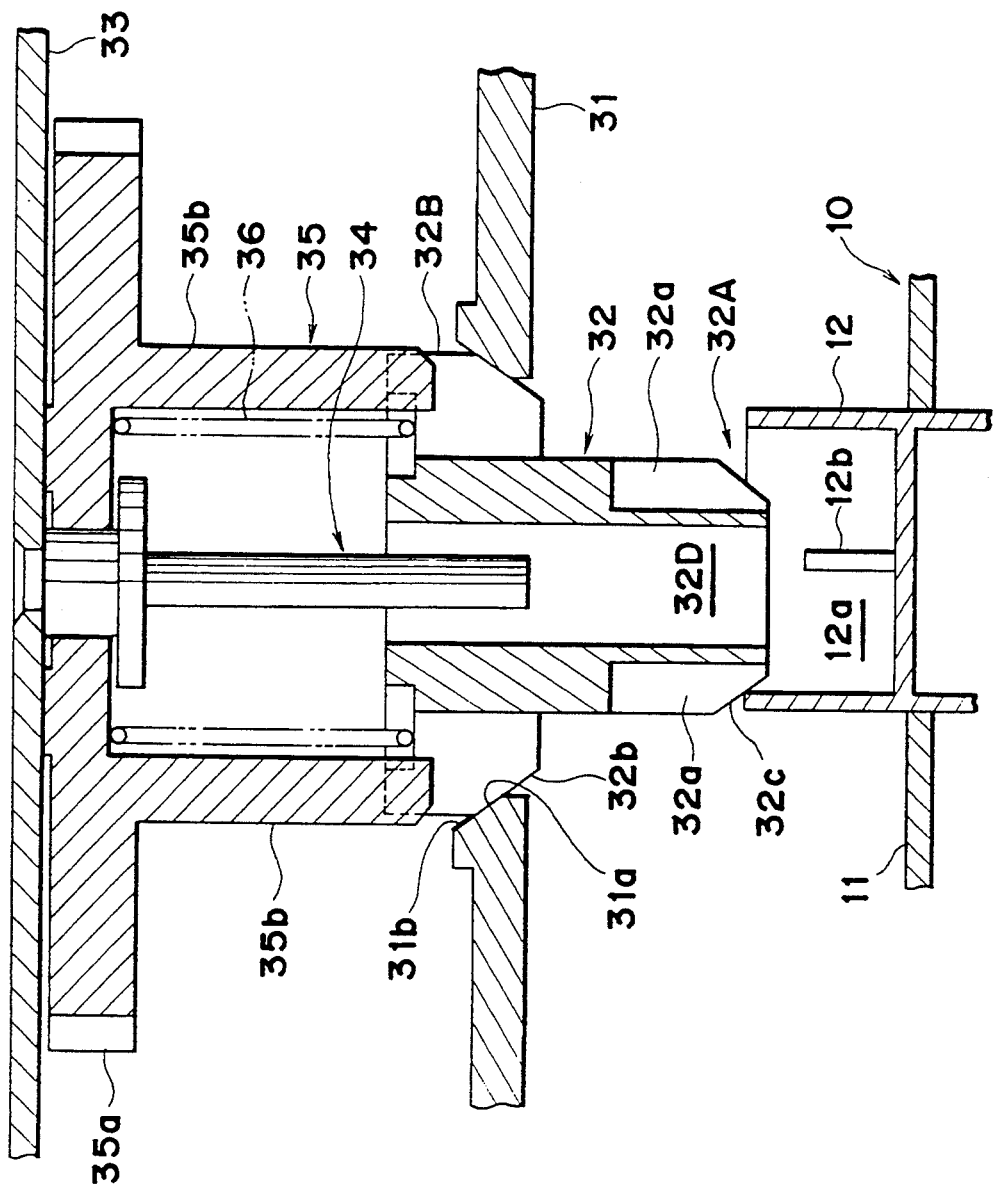
FIG. 6 is a sectional view depicting an initial state where the cartridge is loaded.

FIG. 4 is a plan view illustrating a film cartridge having the above-mentioned difficulty in loading. The cartridge is of the type which is able to feed out a film by rotating its spool shaft. The spool shaft 12 is rotatably axially supported in an interior of a cylindrical body 11 of the cartridge 10. A film (unillustrated) is wound on this spool shaft 12. As depicted in FIG. 6, an upper end of the spool shaft 12 protrudes upwards from the upper surface of the cylindrical body 11; and its upper end surface is formed with a recess 12a assuming a cylindrical shape. Formed inwardly of this recess 12a are two engaging projections 12b capable of engagement with a driving member 32 (FIG. 1) of camera which will be mentioned later.

Planes X1, Y1 orthogonal to each other are reference planes of the cartridge 10. An ideal center of the spool shaft 12 with respect to these reference planes is $O_1$. There exists, however, a possibility wherein an actual center $O_1$, of the spool shaft 12 deviates to any position within a radius $\alpha$ from the ideal center $O_1$ due to a manufacturing error of the cylindrical body 11. FIG. 4 illustrates an example where the actual center $O_1'$, deviates right downwards in the Figure by $\alpha$ from the ideal center $O_1$. Note that the actual center does not deviate by more than $\alpha$.

Figure 2:
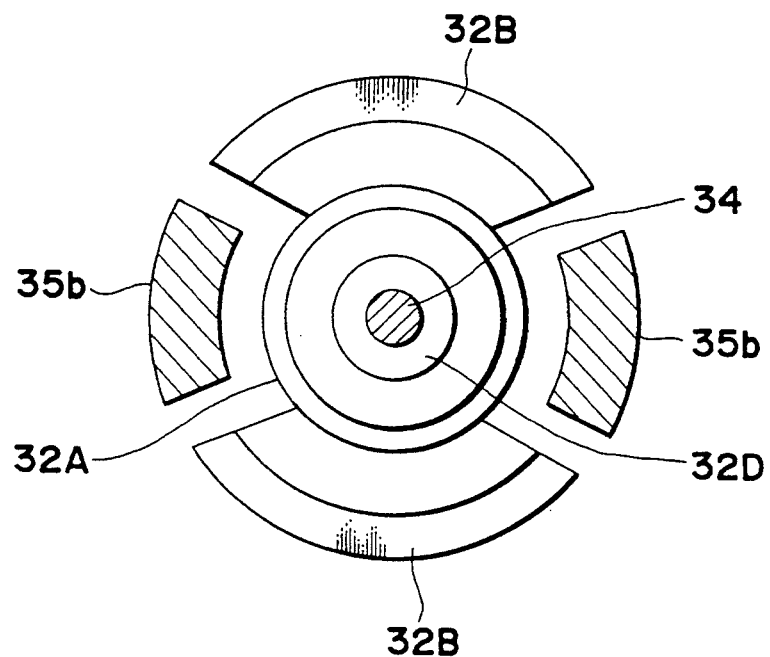
FIG. 2 is a sectional view taken substantially along the line II—II of FIG. 1.

FIG. 1 is a vertical sectional view illustrating a cartridge driving mechanism of a camera according to the present invention. FIG. 2 is a sectional view taken substantially along the line II—II thereof.

Designated by 31 is a support member fixed inwardly of the camera body and formed with a tapered hole 31a on which the driving member 32 for driving the spool shaft 12 of the cartridge 10 rests. This driving member 32 includes: the engaging part 32A having a pair of engaging notches 32a (shown also in FIG. 3) capable of engagement with the engaging projections 12b of the spool shaft 12; and a pair of flange parts 32B (illustrated also in FIG. 2) formed integrally on an upper portion thereof. A tapered surface 32b formed on each flange part 32B rests on a tapered surface 31b of the tapered hole 31a. Namely, the flange parts 32B are fitted in the tapered hole 31a. In this state, the engaging part 32A is centered (located) with respect to the tapered hole 31a.

The driving member 32 is herein movable upwards by a thrust force given from under. As illustrated in, e.g., FIG. 7, when the driving member 32 ascends enough to release the flange parts 32B from being fitted in the tapered hole 31a, the driving member 32, i.e., the engaging part 32A becomes shiftable in a direction (radial direction) orthogonal to the shaft thereof. Further, the tip of the engaging part 32A is formed with a tapered surface 32c on which the upper end surface of the spool shaft 12 impinges when the center of the spool shaft 12 of the cartridge 10 deviates from the driving member 32.

A base generally indicated by 33 is fixed in the interior of the camera body and has its lower surface fitted with a holding shaft 34. The holding shaft 34 is composed of: a caulking part 34a fixed to the base 33 by caulking; a bearing part 34b for rotatably holding a power transmitting member which will be stated later; a flange part 34c provided at the lower portion thereof; and a shaft part 34d provided at the lower portion thereof. The tip of the shaft part 34d is inserted into a through-hole 32D of the driving member 32 described above. This shaft part 34d is intended to prevent more than a predetermined amount of inclination of the driving member 32. The above-described shift of the driving member 32 in the radial direction is regulated by this holding shaft 34.

A power transmitting member 35 consists of a gear part 35a having a gear formed on its peripheral surface and a pair of projections 35b provided integrally at the lower portion thereof. A driving force of an unillustrated motor is transmitted via a gear train to the gear part 35a. Tips of the pair of projections 35b are, as depicted in FIG. 2, inserted into a gap between the pair of flange parts 32B of the above-described driving member 32. Hence, when the power transmitting member 35 rotates, the driving member 32 rotates through the pair of projections 35b.

Further, a coil spring 36 extends between the lower surface of the gear part 35a of the power transmitting member 35 and the upper surface of the driving member 32. The driving member 32 is biased downwards in the Figure by this coil spring 36. The flange parts 32B of the driving member 32 are thereby fitted in the tapered hole 31a when the cartridge 10 is not loaded. Further, when an upward thrust force is exerted on the engaging part 32A, the driving member 32 is driven upwards resisting the biasing force of the spring 36. The driving member 32 is thus retreatable upwards, and therefore the cartridge 10 can be loaded even when the engaging projections 12b of the spool shaft and the notches 32a of the engaging part 32A are out of phase enough to cause an unengaged state thereof.

Figure 3:
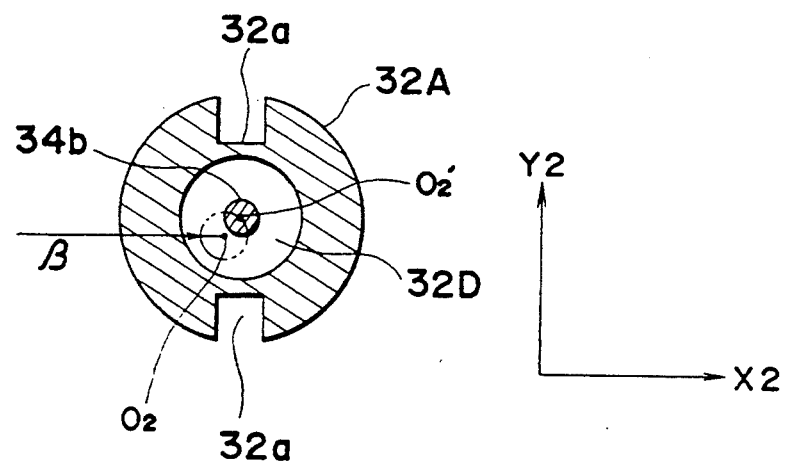
FIG. 3 is a sectional view illustrating a driving member.

Herein, planes X2, Y2 of FIG. 3 are camera-side planes on which the reference planes X1, Y1 (FIG. 4) are superposed when the cartridge 10 is loaded. Where an ideal center of the shaft part 34d, viz., the power transmitting member 35 with respect to these planes X2, Y2 is $O_2$, there exists such a possibility that an actual center $O_2'$, of the shaft part 34d deviates to any position within a radius $\beta$ from the ideal center $O_2$ due to a manufacturing error. FIG. 3 illustrates an example where the actual center $O_2'$, deviates right upwards in the Figure by $\beta$ from the ideal center $O_2$. Note that the actual center does not deviate by more than $\beta$.

Next, a moving quantity of the driving member 32 in the radial direction will be explained.

Figure 5:
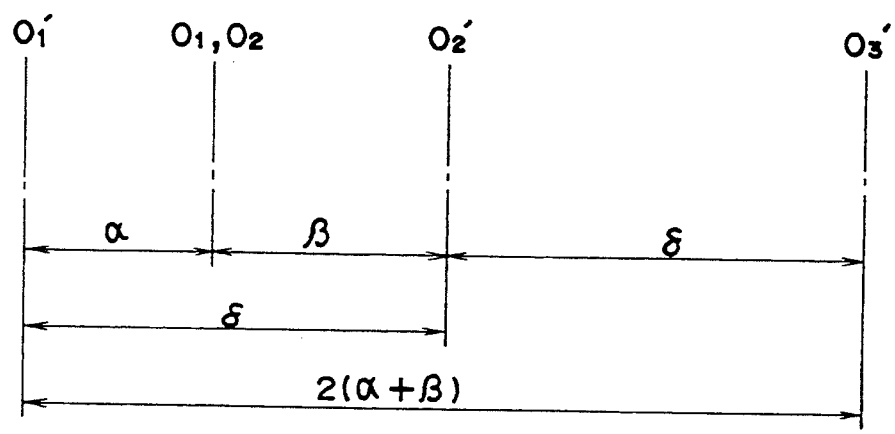
FIG. 5 is a diagram of assistance in explaining central positions of a spool shaft of the cartridge, a holding shaft and the driving member and deviation quantities therebetween.

FIG. 5 is a diagram for showing a relation between each central position and a deviation quantity. The symbols $O_1$, $O_2$ are, as explained earlier, the ideal centers of the cartridge spool shaft 12 and the shaft part 34d. The ideal centers $O_1$, $O_2$ are overlapped when the cartridge 10 is loaded into the camera. As a matter of fact, however, the respective centers $O_1'$, $O_2'$ deviate from the ideal centers $O_1$, $O_2$ by $\alpha$, $\beta$ respectively at the maximum. It follows that the maximum deviation quantity between $O_1'$, $O_2'$ becomes $\alpha+\beta$. Hence, $$\delta \geq \alpha+\beta$$

where $\delta$ is the moving quantity of the driving member 32 with respect to the shaft part 34d. The driving member 32 can be thus centered with respect to the spool shaft 12. This moving quantity is preferably as small as possible and therefore set desirably such as $\delta=\alpha+\beta$. Note that $O_3'$, in the Figure denotes the remotest position from $O_1$, that the center of the driving member 32 can take when $\delta=\alpha+\beta$ (when the left side wall surface of the hole 32D of the driving member 32 in the Figure impinges on the shaft part 34d).

The above-mentioned support member 31 is attached directly to a member for forming the reference planes X2, Y2 of the camera. It can be therefore considered that a deviation of the center of the tapered hole 31a of the support member 31 from the ideal center $O_2$ of the shaft part 34d is smaller than $\beta$ (herein, $\beta/2$). Accordingly, in a state where the flange parts 32B of the driving member 32 are, as illustrated in FIG. 1, fitted in the tapered hole 31a of the support member 31, it follows that the actual central position of the driving member 32 deviates by $\beta/2$ at the maximum from the ideal center $O_2$. From this fact, where a length d of the tapered surface 32c of the engaging part 32A of the driving member 32 in the radial direction is given by $\alpha+\beta/2$, the upper end portion of the spool shaft 12, as depicted in FIG. 6, invariably impinges on the tapered surface 32c when loading the cartridge 10 eccentric from the engaging part 32A. The above-described length d is expressed by $\alpha+\beta$ in this embodiment.

Figure 7:
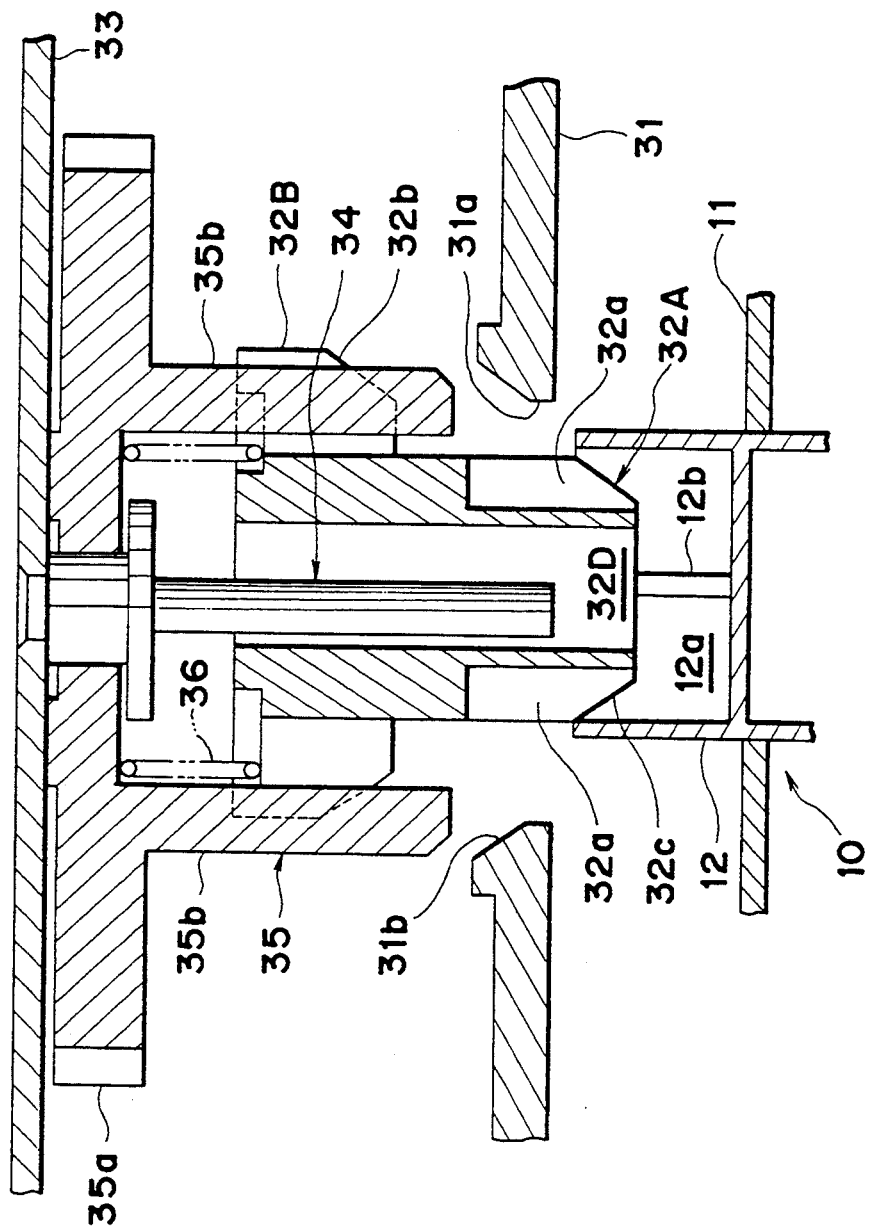
FIG. 7 is a sectional view illustrating a state where the driving member is centered with respect to the spool shaft.
Figure 8:
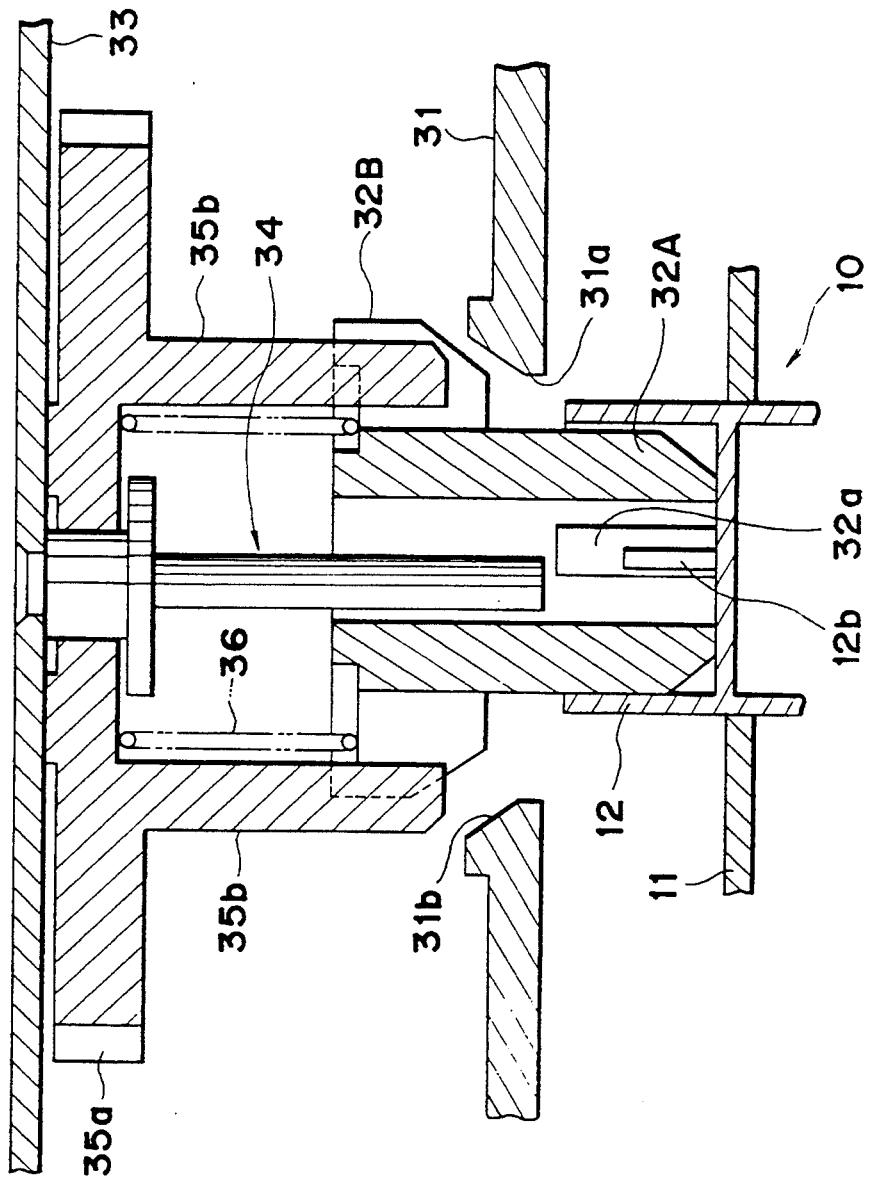
FIG. 8 is a sectional view illustrating a state where the driving member engages with the spool shaft.

Next, an explanation of the operation when loading the cartridge 10 into the camera will be explained with reference to FIGS. 6 to 8.

The cartridge 10 eccentric from the driving member 32 is inserted into a cartridge chamber via a hole formed in the bottom of the camera body in accordance with the foregoing drop-in load system, and a cartridge cover is closed. Then, the cartridge 10 is thrust upwards by the cartridge cover. As illustrated in FIG. 6, the upper end surface of the spool shaft 12 impinges on the tapered surface 32c of the engaging part 32A of the driving member 32. When the cartridge 10 is further thrust upwards in this state, the driving member 32 is moved upwards resisting the biasing force of the spring 36 while being pushed up by the cartridge 10. The flange parts 32B disengage from the tapered hole 31a, and the driving member 32 is thereby shiftable in the radial direction thereof.

Further at this moment, the driving member 32 undergoes a force acting in the centering direction with respect to the center of the spool shaft 12 due to the engagement of the upper end portion of the spool shaft with the tapered surface 32c. The driving member 32 therefore shifts in the radial direction with the disengagement of the flange parts 32B from the tapered hole 31a. When the push-up of the cartridge 10 stops upon a complete close of the cartridge cover, as depicted in FIG. 7, the driving member 32 is centered with respect to the spool shaft 12. In the Figure, however, the engaging projections 12b of the spool shaft 12 and the notches 32a formed in the engaging part 32A of the driving member 32 are out of phase and not yet therefore engaged with each other.

Thereafter, when driving the unillustrated motor, the power transmission member 35 is rotated by this driving force via the gear train. The driving member 32 is rotated by the projections 35b through the flange parts 32B. Then, when rotated up to such a position that the notches 32a of the engaging part 32A match with the engaging projections 12b of the spool shaft 12, the driving member 32 is lowered by the biasing force of the spring 36, with the result that the notches of the engaging part 32A are, as illustrated in FIG. 8, engaged with the engaging projections 12b of the spool shaft 12. The lower end portion of the engaging part 32A impinges on the bottom surface of the recess 12a, thereby stopping the descent of the driving member 32. With this engagement, the spool shaft 12 is rotated subsequently with the rotations of the driving member 32. The film is fed out of the cartridge 10 with the rotations of this spool shaft 12. The film is wound on an unillustrated take-up spool of the camera, thus performing film-loading.

It is to be noted that if the engaging projections and the notches 32a are, though quite rare, in phase from the first onset of cartridge loading, the two components engage with each other just when centering is carried out, and thereafter the driving member 32 is pushed up by the bottom surface of the recess 12a of the spool shaft 12. Further, if the center of the spool shaft 12 initially coincides with the center of the driving member 32 (in the case of no eccentricity), the two components are already in the possible-of-engagement state (however, if they are in phase). Consequently, the upper end portion of the spool shaft 12 does not impinge on the tapered surface 32c of the engaging part 32A during the loading, and the engaging part 32A does not shift in the axial direction.

Further, when taking the cartridge 10 out of the camera, the cartridge 10 is moved downwards in the Figure, and the driving member 32 is lowered by the biasing force of the spring 36 with the descent of the spool shaft 12. The flange parts 32B are fitted in the tapered hole 31a, thus stopping the driving member 32. Namely, the driving member 32 reverts to the state shown in FIG. 1.

Incidentally, a mechanism for locating the engaging part 32A of the driving member 32 may be constructed otherwise than the tapered hole and the tapered surface. Further, the mechanism for centering the engaging part 32A is not, however, limited to that of the embodiment. For instance, the lower end portion of the engaging part 32A may be provided with a projection, and a tapered portion may be provided in the spool shaft 12. Centering may be thereby performed.

In the film cartridge driving mechanism in accordance with this embodiment, the locating part is engaged with the camera body, thereby locating the engaging part in the predetermined position. The biasing is effected to engage the locating part with the camera body. When located, the engaging part is shifted in the radial direction upon an impingement on the spool shaft of the cartridge to be loaded and thus centered with respect to the spool shaft. Therefore, when loading the cartridge into the camera by the above-mentioned drop-in system, and even if the engaging part decenters from the spool shaft, the engaging part can be surely centered enough to develop the possible-of-engagement state. It is therefore feasible to surely transmit the rotations.

The following is a description of a second embodiment of the present invention with reference to FIGS. 9 through 18.

To begin with, an outline of the film cartridge driving mechanism in this embodiment will be explained with reference to FIGS. 9 to 14. The present invention is applied to the cartridge driving mechanism of a camera. The cartridge driving mechanism includes: a driving member 135 capable of engagement with a spool shaft 112 of a cartridge 110 loaded; and a power transmitting member 138 for transmitting a driving force of a motor to the driving member 135, whereby the spool shaft 112 is rotated with rotations of the driving member 135.

Then, the driving member 135 includes a biasing means 139 (e.g., a conical coil spring) for making the driving member 135 shiftable by a predetermined quantity in the radial direction with respect to the power transmitting member 138 and simultaneously biasing the driving member 135 in the radial direction so that a rotational center of the driving member 135 coincides substantially with a rotational center of the power transmitting member 138; and a shaft member 132 which impinges on the spool shaft 112 of the cartridge 110 to be loaded and shifts the driving member 135 in the radial direction resisting the above-mentioned biasing to thereby obtain a state where the driving member 135 is centered with respect to the spool shaft 112.

The biasing means 139 biases the driving member 135 in the radial direction so that the rotational center of the driving member 135 coincides with the rotational center of the power transmitting member 138. When loading the cartridge 110 eccentric in this state, the shaft member 132 impinges on the spool shaft 112 of the cartridge 110 to be loaded, thereby moving the driving member 135 in the radial direction resisting the above-stated biasing. Developed is a state where the driving member 135 is centered with respect to the spool shaft 112. The spool shaft 112 of the cartridge 110 can be thereby engaged with the driving member 135.

Figure 13:
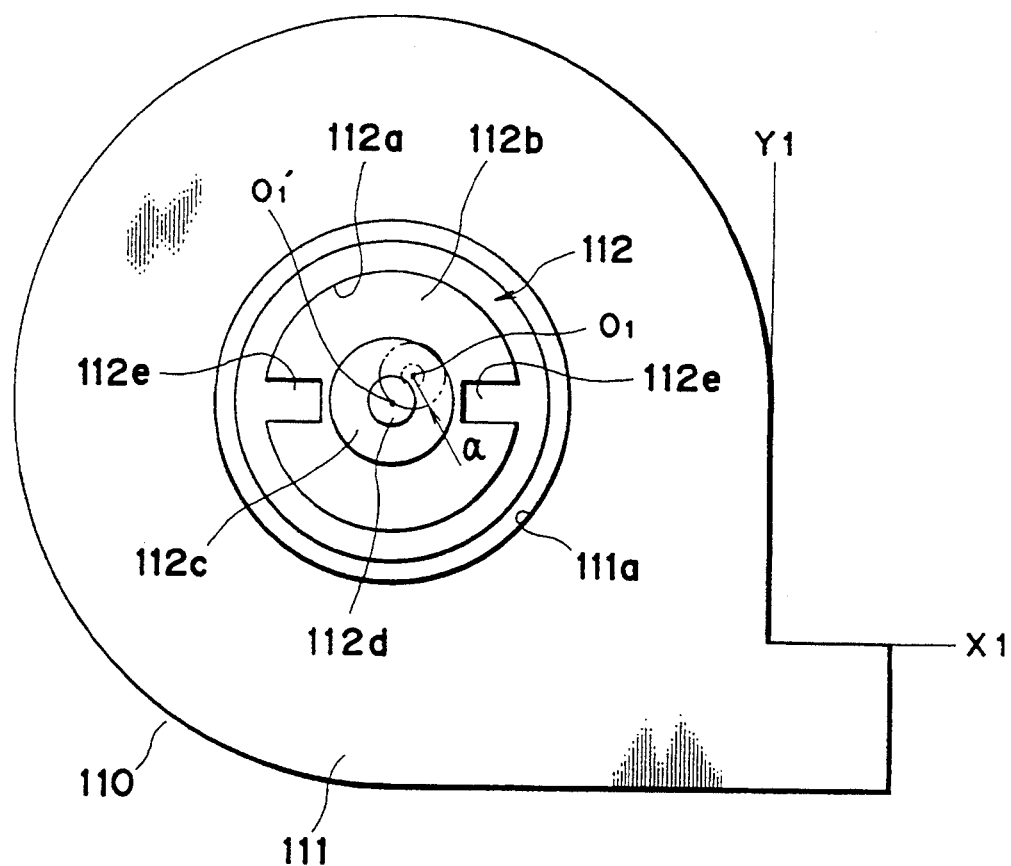
FIG. 13 is a plan view showing a film cartridge.
Figure 14:
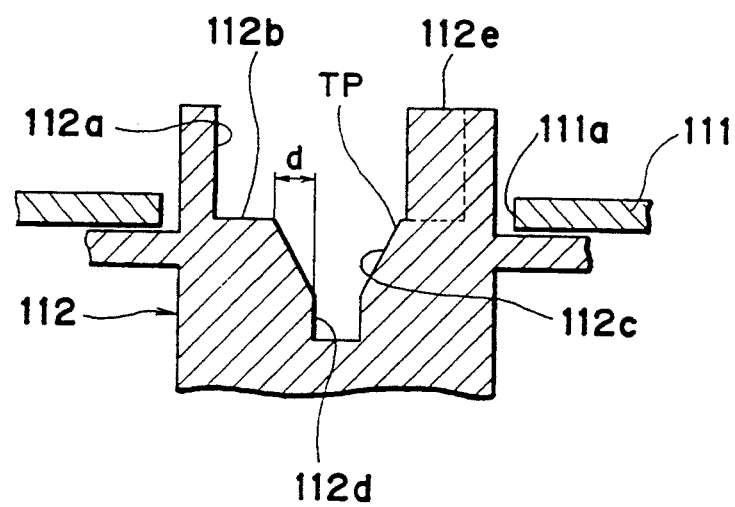
FIG. 14 is a partial sectional view illustrating the same film cartridge.

FIG. 13 is a plan view illustrating another film cartridge having the above-mentioned difficulty in loading. The cartridge is of the type which is able to feed out a film by rotating its spool shaft. FIG. 14 is a partial vertical sectional view thereof. The spool shaft 112 is rotatably axially supported in an interior of a cylindrical body 111 of the cartridge 110. A film (unillustrated) is wound on this spool shaft 112. The upper end portion of the spool shaft 112 protrudes upwards from a hole 111a formed in the upper surface of the cylindrical body 111. A gap is formed between the peripheral surface of the spool shaft 112 and the inner surface of the hole 111a. The spool shaft 112 is shiftable in this gap in a direction orthogonal to the axis thereof, i.e., in the radial direction. Further, a cylindrical recess 112a is formed in the upper end surface of the spool shaft 112, and at the same time a bottom surface 112b of this recess 112 is formed with a tapered recess 112c having a tapered surface TP. In addition, the tip thereof is formed with a hole 112d. Formed further in the cylindrical recess 112a are two engaging projections 112e capable of engagement with a driving member 135 (FIG. 9) of a camera which will be mentioned later. Herein, the centers of the recesses 112a, 112c and the hole 112d coincide with each other.

Planes X1, Y1 (FIG. 13) orthogonal to each other are reference planes for the flat surface of the cartridge 110. An ideal center of the spool shaft 112 with respect to these reference planes is $O_1$. There exists, however, a possibility wherein an actual center $O_1'$, of the spool shaft 112 deviates to any position within a radius from the ideal center $O_1$. This is attributed to a manufacturing error of the cylindrical body 111 and to such a construction that the spool shaft 112 is shiftable in the radial direction thereof. FIG. 13 illustrates an example where the actual center $O_1'$, deviates left downwards in the Figure by $\alpha$ from the ideal center $O_1$. Note that the actual center does not deviate by more than $\alpha$.

Figure 9:
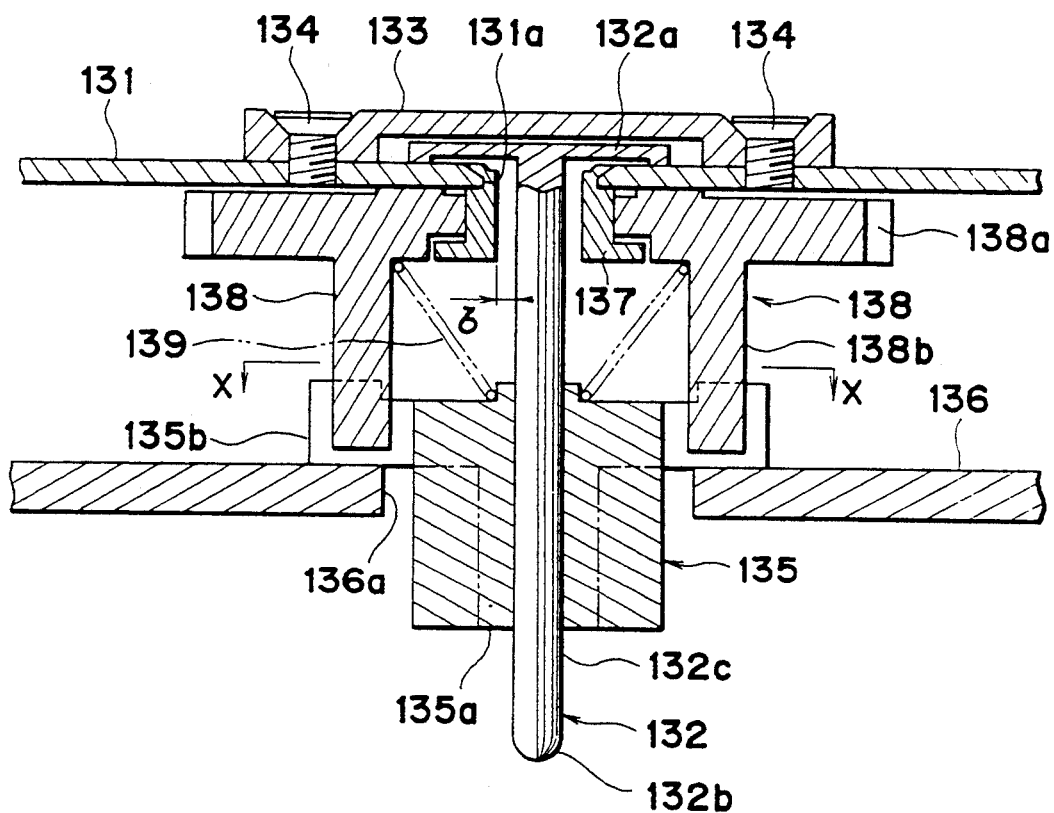
FIG. 9 is a sectional view demonstrating another embodiment of the cartridge driving mechanism according to the present invention.
Figure 10:
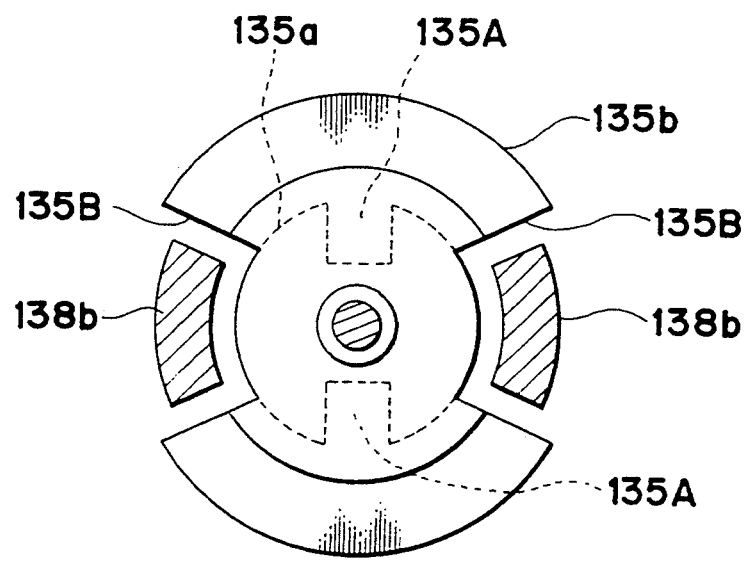
FIG. 10 is a sectional view taken substantially along the line X—X of FIG. 9.

FIG. 9 is a vertical sectional view depicting the cartridge driving mechanism of camera in accordance with this embodiment. FIG. 10 is a sectional view taken substantially along the line X—X thereof.

Designated by 131 is a base fixed inwardly of the camera body. This base 131 is provided with a hole 131a through which a shaft body 132c of a support shaft 132 passes. A collar part 132a provided at its upper end is fixed to the upper surface of the base 131. A cover 133 is so secured to the upper surface of the base 131 with screws 134 as to cover the collar part 132a. A gap is formed between the collar part 132a and an inner peripheral surface of the cover 133. A gap is formed also between the shaft body 132c and a bearing member 137 which will hereinafter be stated. The support shaft 132 is shiftable in the gap between the shaft body 132c and the bearing member 137 in the radial direction. Further, the shaft body 132c slidably passes through a central position of the driving member 135, and its tip 132b assumes a spherical shape.

Figure 11:
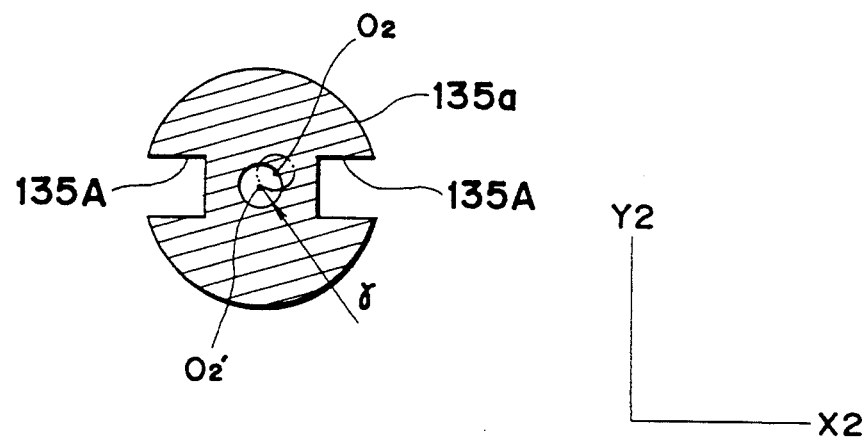
FIG. 11 is a sectional view illustrating the driving member.

The driving member 135 is constructed of an engaging part 135a and a collar part 135b formed on the upper portion of a peripheral surface of the engaging part 135a. The driving member 135 is slidable in the axial direction along the support shaft 132 described above and also shiftable in the radial direction together with the support shaft 132. The engaging part 135a is inserted into a hole 136a of the support member 136 constituting the camera body. The lower portion of a peripheral surface thereof is, as illustrated in FIG. 11, formed with two notches 135A engaging with engaging projections 112e of the spool shaft 112 of the foregoing cartridge 110. Besides, the collar part 135b is supported on the upper surface of the support member 136; and its peripheral surface is, as depicted in FIG. 10, formed with two notches 135B capable of engagement with projections 138b of a power transmitting member 138 which will be stated latter.

Moreover, the bearing member 137 is fixed to a peripheral edge of the hole 131a on the lower surface of the base 131 described above. The power transmitting member 138 is rotatably supported on this bearing member 137. The power transmitting member 138 is composed of a gear part 138a having a gear formed on the peripheral surface and a pair of projections 138b provided integrally with the lower portion thereof. A driving force of an unillustrated motor is transmitted via a gear train to the gear part 138a. Tips of the pair of projections 138b are inserted into notches 135B of the aforementioned driving member 135. When the power transmitting member 138 is thereby rotated, the driving member 135 is rotated through the pair of projections 138b.

Furthermore, a conical coil spring 139 extends between the lower surface of the gear part 138a of the power transmitting member 138 and the upper surface of the driving member 135. A diameter (maximum diameter) of one end of this conical coil spring 139 which is secured to the lower surface of the gear part 138a is substantially equal to a diameter of the engaging part 135a of the driving member 135. Further, a diameter (minimum diameter) of the other end secured to the upper surface of the driving member 135 is substantially equal to that of a projection of the upper surface of the driving member 135. This conical coil spring 139 exhibits the following two actions:

(1) Energizing the driving member 135 downwards invariably in the axial direction in the Figure; and
(2) Centering the support shaft 132, i.e., the driving member 135 with respect to the above-mentioned power transmitting member 138 by biasing the driving member 135 in the radial direction with a force to hold a normal conical configuration.

Herein, planes X2, Y2 of FIG. 11 are camera-side planes on which the reference planes X1, Y1 (FIG. 13) are superposed when the Cartridge 110 is loaded. Where an ideal center of the driving member 135 with respect to these planes X2, Y2 is $O_2$, there exists such a possibility that an actual center $O_2'$ (centered by the conical coil spring 139) of the driving member 135 deviates to any position within a radius $\gamma$ from the ideal center $O_2$ due to a positional deviation derived from a manufacturing error of the above-mentioned bearing member 137. FIG. 11 illustrates an example where the actual center $O_2'$ deviates left downwards in the Figure by $\gamma$ from the ideal center $O_2$. Note that the actual center does not deviate by more than $\gamma$.

Next, moving quantities of the spool shaft 112 and the driving member 135 in the radial direction will be explained.

Figure 12:
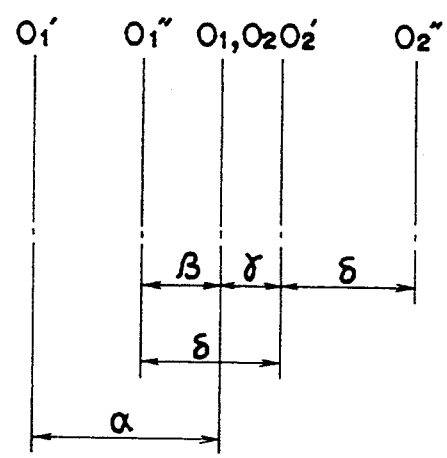
FIG. 12 is a diagram of assistance in explaining deviation quantities between respective central positions.

FIG. 12 is a diagram for showing a relation between each central position and a deviation quantity. The symbols $O_1$, $O_2$ are, as explained earlier, the ideal centers of the cartridge spool shaft 112 and the driving member 135. The ideal centers $O_1$, $O_2$ are superposed when the cartridge 110 is loaded into the camera. As a matter of fact, however, the respective centers $O_1'$, $O_2'$ deviate from the ideal centers $O_1$, $O_2$ by $\alpha$, $\gamma$ respectively at the maximum. It follows that the maximum deviation quantity between $O_1'$ and $O_2'$ becomes $\alpha+\gamma$.

By the way, as explained earlier, the spool shaft 112 is constructed to be shiftable in the gap from the hole 111a shown in FIG. 14 in the radial direction. Hence, even if the initial deviation between $O_1$ and $O_1'$ is $\alpha$, the center $O_1'$ is shiftable by a predetermined quantity towards the ideal center $O_1$. However, the center $O_1'$, is shiftable only up to a position (indicated by $O_1''$) spaced $\beta(\alpha > \beta)$ away from the ideal center $O_1$ because of the manufacturing error of the cartridge 110. Therefore, a deviation quantity between the center $O_1''$ after the spool shaft 112 has been moved and the actual center $O_2'$ of the driving member 135 is $\beta+\gamma$ at the maximum.

Accordingly, the moving quantity δ (FIG. 9) of the driving member 135 in the radial direction is given by:

$$\delta \geq \beta + \gamma$$

Then, the driving member 135 can be centered with respect to the spool shaft 112. Note that $O_2''$ in the FIG. 12 indicates the remotest position from $O_1'$, that the center of the driving member 135 can take when $\delta=\beta+\gamma$ (when the shaft part 132c impinges on the right inner surface of the bearing member 137 in the Figure).

Further, the deviation quantity between the center $O_1'$, before the spool shaft 112 moves and the actual center $O_2'$, of the driving member 135 is $\alpha+\gamma$ at the maximum. Therefore, if a length d (FIG. 14) of the tapered surface TP of the spool shaft 112 in the radial direction is set to $\alpha+\gamma$ or more, and when loading the cartridge 110 eccentric from the driving member 135 centered with respect to the power transmitting member 138, it follows that the tip 132b of the support shaft 132 invariably impinges on the tapered surface TP. Therefore, the length d is set to $\alpha+\gamma$ or more in this embodiment.

Figure 15:
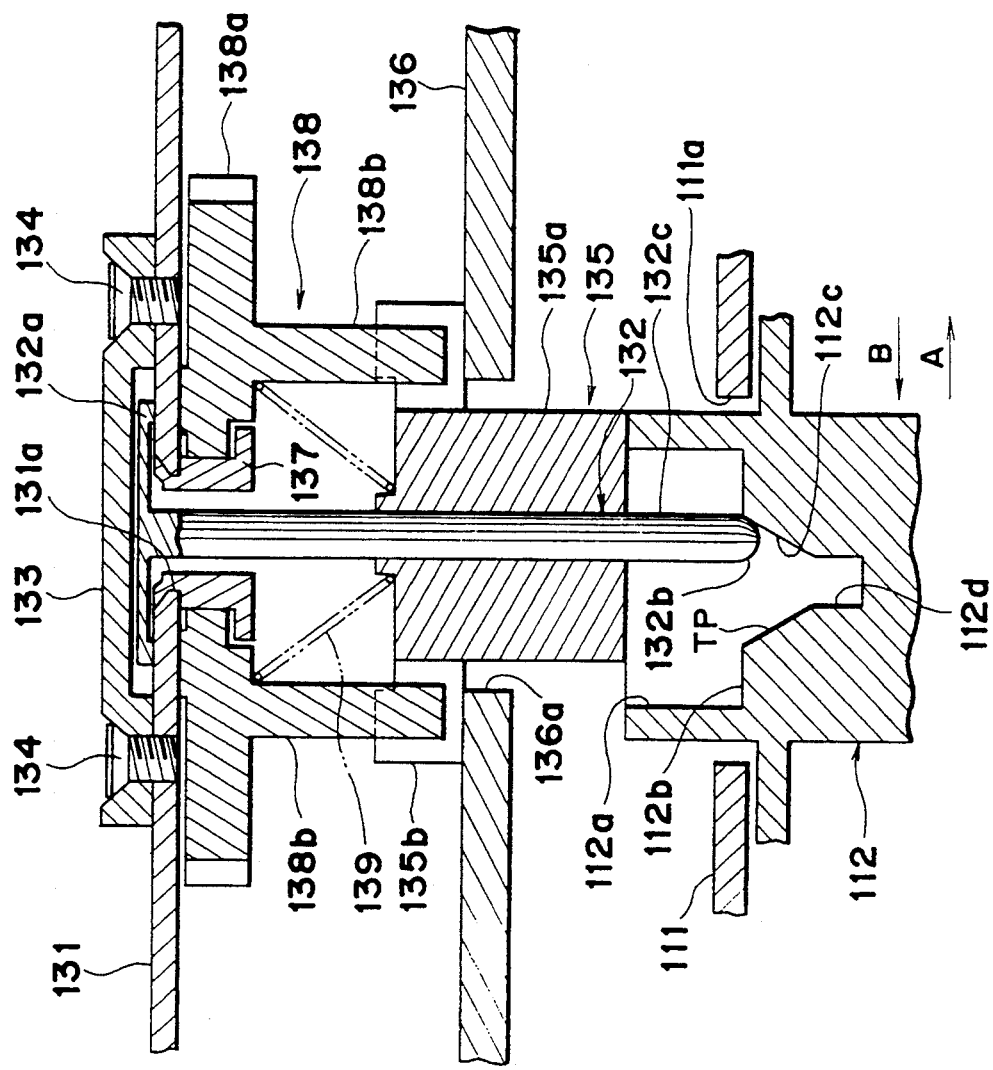
FIG. 15 is a sectional view showing an initial state where the cartridge is loaded.
Figure 16:
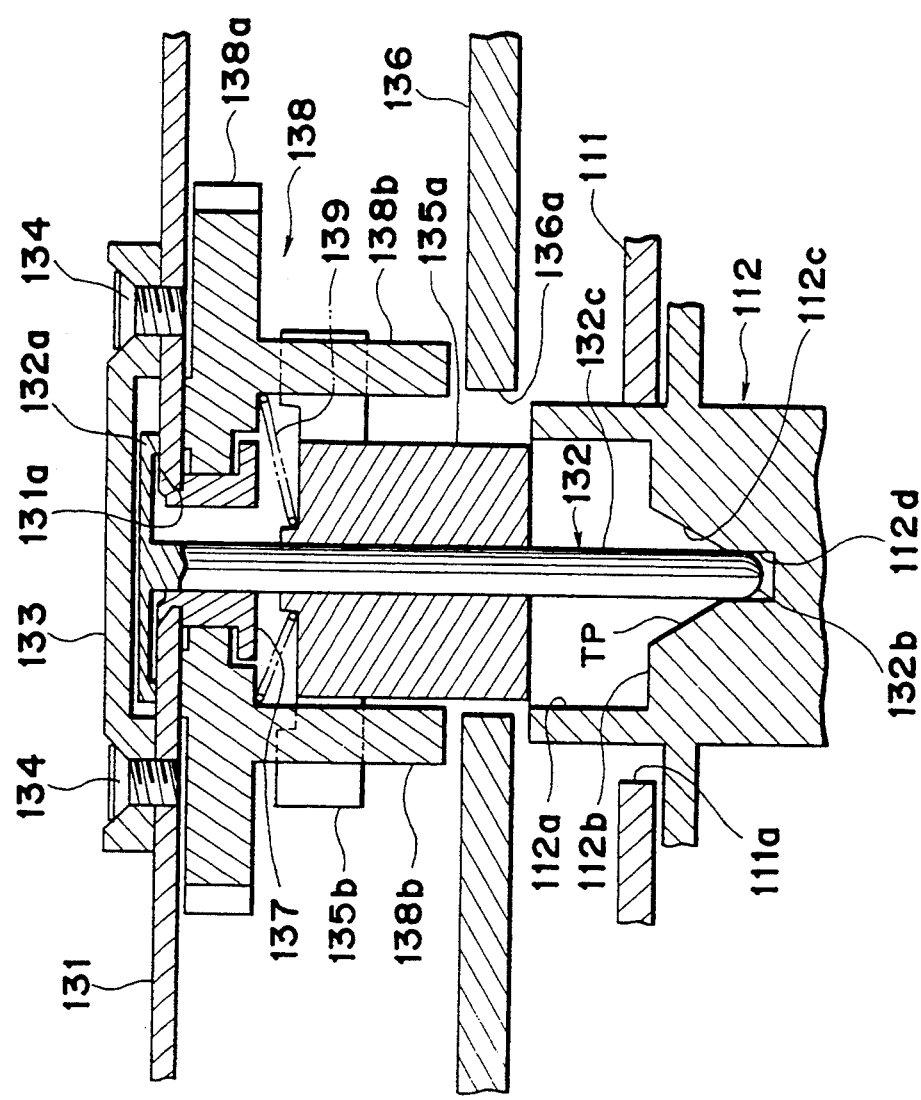
FIG. 16 is a sectional view showing a state where the center of the driving member coincides with the center of the spool shaft.

Next, the operation during the loading of the cartridge 110 will be explained with reference to FIGS. 15 through 17. It is herein assumed in the following description that the center of the spool shaft 112 of the cartridge 110 deviates by $\alpha+\gamma$ (maximum deviation quantity) from the center of the driving member 135.

The cartridge 110 is inserted into the cartridge chamber from the hole formed in the bottom of the camera body by the above-described drop-in load system. When the cartridge cover is closed, the cartridge 110 is thrust upwards by the cartridge cover, and, as illustrated in FIG. 15, the upper end surface of the spool shaft 112 impinges on the lower surface of the driving member 135. At the same moment, the tip 132b of the support shaft 132 impinges on the tapered surface TP of the tapered recess 112c of the spool shaft 112. When the cartridge 110 is further thrust upwards in this state, the driving member 135 moves upwardly while sliding on the support shaft 132 with resistance to the biasing in the radial direction by the conical coil spring 139. On this occasion, the spool shaft 112 is moved in a direction A shown in the Figure, with the tapered surface TP being pushed by the tip 132b of the support shaft 132. The spool shaft 112 thereby impinges on the wall surface of a hole 111a of the cylindrical body 111, and its movement is thus stopped. The moving quantity of the spool shaft 112 at this time is given by $\alpha - \beta$ (FIG. 12). At this point of time, the center of the spool shaft 112 deviates by $\beta + \gamma$ from the center of the driving member 135.

When the cartridge 110 is further pushed upwards in this state, the tip 132b of the support shaft 132 is pushed against the tapered surface TP of the spool shaft 112. The support shaft 132 is thereby moved in the illustrated direction B while resisting the aligning action of the conical coil spring 139, and the cartridge cover is completely closed. Just then, as depicted in FIG. 16, the support shaft 132 impinges on the inner peripheral surface of the bearing member 137, thereby stopping the movement. The moving quantity of the support shaft 132 at this time is $\beta + \gamma$, and the driving member 135 is centered with respect to the spool shaft 112 at this point of time. Consequently, the tip 132b of the support shaft 132 sinks in the hole 112d of the spool shaft 112. In the Figure, however, the engaging projections 112e of the spool shaft 112 and the notches 135A formed in the engaging part 135a of the driving member are out of phase and not therefore engaged with each other.

Thereafter, when driving the unillustrated motor, the power transmitting member 138 is rotated by the driving force thereof through the gear train. The driving member 135 is rotated by the projections 138b through the collar part 135b. Then, when the driving member 135 rotates up to the position in which the notches 135A of the engaging part 135a match with the engaging projections 112e, the driving member 135 is lowered by the biasing force of the spring 139 in the axial direction. The notches 135A of the engaging part 135a are, as shown in FIG. 17, engaged with the engaging projections 112e of the spool shaft 112. With this engagement, the spool shaft 112 is subsequently rotated concomitantly with the rotations of the driving member 135. The film is fed out of the cartridge 110 with the rotations of this spool shaft 112 and wound on an unillustrated take-up spool of camera, thus performing the film-loading.

Figure 17:
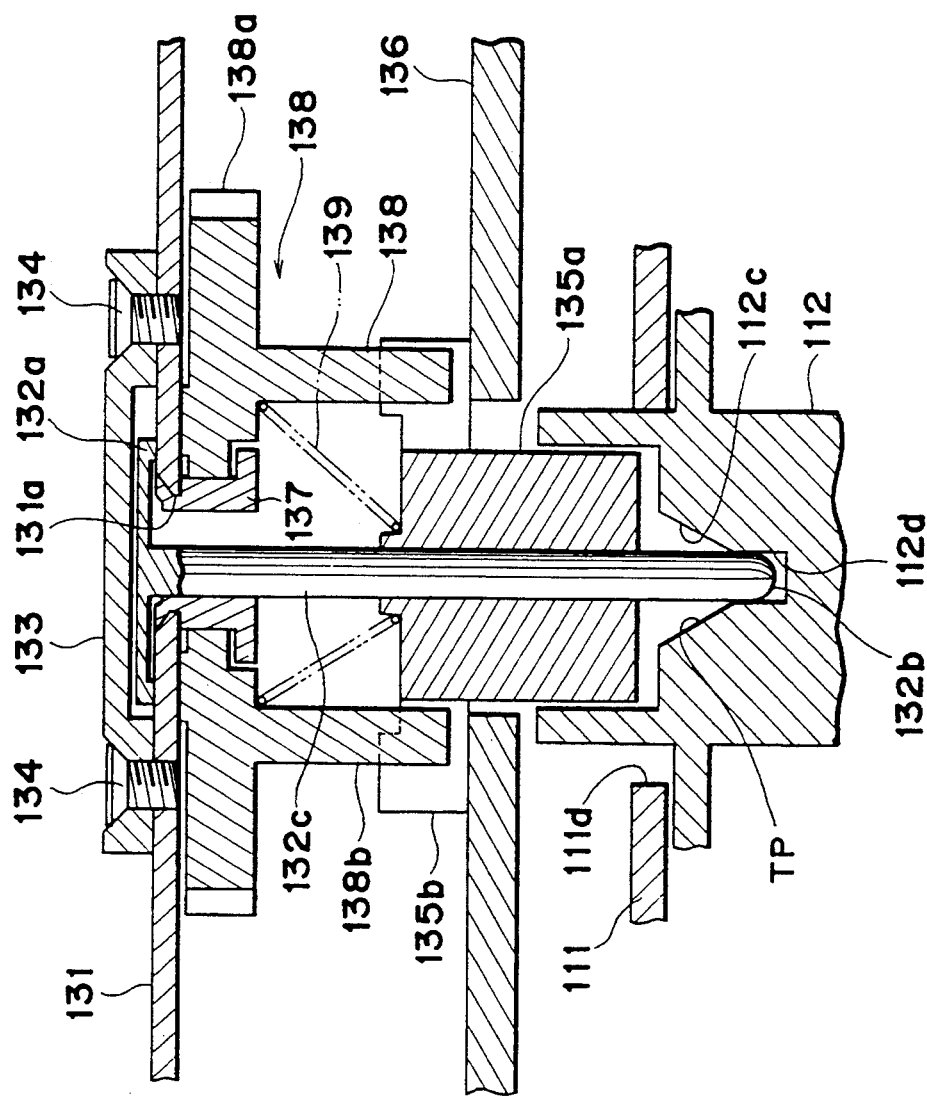
FIG. 17 is a sectional view illustrating a state where the spool shaft engages with the driving member.

Referring to FIG. 17, the center of the driving member 135 herein does not coincide with the center of the power transmitting member 138. The shaft body 132c of the support shaft 132 contacts the bearing member 137, and the spool shaft 112 contacts the wall surface of the hole 111a of the cylindrical body 111. Hence, a power transmitting efficiency to the spool shaft 112 decreases. However, the film feed can be surely performed.

Note that if the notches 135A and the engaging projections 112e are, though extremely rate, in phase from the first onset of cartridge loading, the two components engage with each other just when performing the centering. The driving member 135 descends down to the position in which the collar part 135b impinges on the upper surface of the support member 136.

Figure 18:
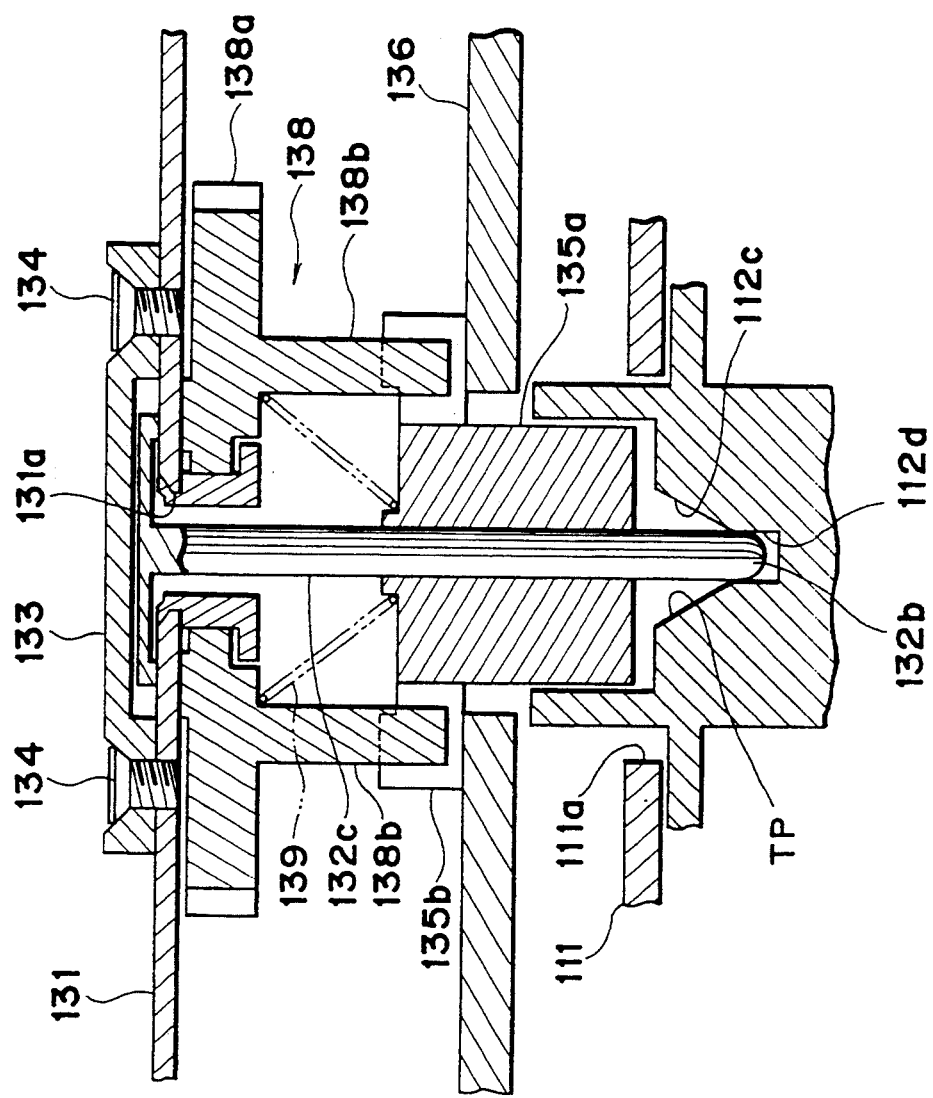
FIG. 18 is a sectional view illustrating a case where the cartridge with a small eccentric quantity of the spool shaft is loaded.

Further, if the deviation quantity between the central position of the spool shaft 112 and that of the driving member 135 is less than a shiftable quantity of the spool shaft 112, only the spool shaft 112 is shifted in the radial direction by the aligning action of the conical coil spring 139, whereas the driving member 135 is not shifted in the radial direction. FIG. 18 illustrates this state. In this instance, the center of the driving member 135 coincides with the center of the power transmitting member 138. The shaft body 132c of the support shaft 132 and the spool shaft 112 do not contact the wall surface of the hole 111a and the bearing member 137. The power transmitting efficiency to the spool shaft 112 is therefore enhanced.

Furthermore, if the center of the spool shaft 112 initially coincides with the center of the driving member 135 (in the case of no eccentricity), the two components are already in the possible-of-engagement state (however, they are in phase). Consequently, neither the spool shaft 112 nor the driving member 135 shifts in the radial direction during the loading.

Besides, when moving the cartridge 110 downwards in the Figure for taking the cartridge out of the camera, the driving member 135 is lowered with a descent of the spool shaft 112 while sliding on the support shaft 132 by dint of the biasing force of the conical coil spring 139 in the axial direction. Simultaneously, the support shaft 132 and the driving member 135 are moved by the biasing force of the spring 139 in the radial direction, and the centers thereof coincide with the center of the power transmitting member 138. As a result, the driving member 135 reverts to the state shown in FIG. 9.

It is to be noted that the biasing means is not limited to the above-described conical coil spring 139 on condition that it biases the driving member 135 in the radial direction to make the rotational center of the driving member 135 coincident with that of the power transmitting member 138. Exemplified is a case where the spool shaft 112 of the cartridge 110 is shiftable in the radial direction with respect to the cylindrical body 111. It is, however, permitted that this spool shaft is unshiftable in the radial direction, whereas only the driving member 135 is shiftable in the radial direction. Not limited to the embodiment are the configurations of the driving member 135 and the engaging part of the spool shaft and the construction of the power transmitting member as well.

In accordance with this embodiment, the biasing means biases the driving member in the radial direction so that the rotational center of the driving member coincides substantially with the rotational center of the power transmitting member. When the cartridge is loaded at this moment, the spool shaft thereof impinges on the shaft member. The driving member is shifted in the radial direction by the spool shaft while resisting the above-mentioned biasing and is thereby centered with respect to the spool shaft. Accordingly, when loading the cartridge into the camera by the foregoing drop-in system, and even if the center of the driving member of camera deviates to some extent from the center of the spool shaft, the driving member is centered with respect to the spool shaft. The two components are put into the possible-of-engagement state, and the film can be surely fed.

Although the illustrative embodiments of the present invention have been described in detail with reference to the accompanying drawings, the present invention is not limited to those embodiments. Various changes or modifications may be effected by one skilled in the art without departing from the scope or spirit of the invention.

What is claimed is:

1. A film cartridge positioning device of a camera comprising:
   an engagement member which is capable of engaging with a spool shaft of the film cartridge and which is rotatable about an axis;
   a support portion which supports said engagement member in such a way that said engagement member is substantially movable in a direction along said axis and in directions transverse to said axis; and
   a positioning portion which positions said engagement member to a predetermined position with respect to directions transverse to said axis before loading of said film cartridge.

2. A film cartridge positioning device according to claim 1 wherein said positioning portion includes:
   a member formed with a tapered hole; and
   a tapered portion capable of engaging with said tapered hole;
   and wherein said engagement member is positioned to said predetermined position when said tapered portion engages with said tapered hole.

3. A film cartridge positioning device according to claim 2 wherein said tapered portion and said engagement member move integrally.

4. A film cartridge positioning device according to claim 1 further comprising a power transmission member for rotating said engagement member.

5. A film cartridge positioning device according to claim 4 wherein said engagement member has a power receiving portion for receiving power from said power transmission member which in turn has a power supplying portion to be in contact with said power receiving portion to rotate said engagement member, and wherein there is a space between said engagement member and said power transmission member to ensure movement of said engagement member in directions transverse to said axis, and said power receiving portion and said power supplying portion are in contact with each other when said engagement member is rotated.

6. A film cartridge positioning device according to claim 1 further comprising a centering portion for centering said engagement member with respect to said spool shaft when said spool shaft of a loaded cartridge is not positioned within a predetermined region corresponding to said predetermined position, by moving said engagement member in a direction transverse to said axis.

7. A film cartridge positioning device according to claim 6 wherein said centering portion includes a tapered portion formed on a tip of said engagement member, and wherein when said tapered portion formed on the tip of the engagement member is in contact with said spool shaft at the time of loading of said film cartridge, said engagement member is moved in a direction transverse to said axis so as to be centered with respect to said spool shaft.

8. A film cartridge positioning device of a cad, era comprising:
   an engagement member which is capable of engaging with a spool shaft of the film cartridge and which is rotatable about an axis; and
   a positioning member, which supports said engagement member in such a way that said engagement member is substantially movable in a direction along said axis and in directions transverse to said axis, for positioning said engagement member to a predetermined position with respect to directions transverse to said axis before loading of said film cartridge.

9. A film cartridge positioning device according to claim 8 further comprising a centering portion for centering said engagement member with respect to said spool shaft when said spool shaft of a loaded cartridge is not positioned within a predetermined region corresponding to said predetermined position, by moving said engagement member in a direction transverse to said axis.

10. A film cartridge positioning device according to claim 8 wherein said positioning member is a conical coil spring.

11. A film cartridge positioning device of a camera comprising:
    an engagement member which is capable of engaging with a spool shaft of the film cartridge and which is rotatable about an axis;
    a support portion which supports at least one of said engagement member and said spool shaft in such a way that said engagement member and said spool shaft are substantially movable relative to each other in a direction along said axis and in directions transverse to said axis; and
    a positioning portion which regulates relative positioning of said engagement member and said spool shaft with respect to said directions transverse to said axis before loading of said film cartridge.

12. A film cartridge positioning device of a camera comprising:
    an engagement member which is capable of engaging with a spool shaft of the film cartridge and which is rotatable about an axis, the engagement member having a power receiving portion; and
    a power transmission member having a power supplying portion to be in contact with said power receiving portion for rotating said engagement member;
    wherein there is a space between said engagement member and said power transmission member to ensure substantial movement of said engagement member in directions transverse to said axis, and said power receiving portion and said power supplying portion are in contact with each other when said engagement member is rotated.

13. A film cartridge positioning device according to claim 12 further comprising:
    a positioning portion for positioning said engagement member to a predetermined position with respect to directions transverse to said axis before loading of the film cartridge.

14. A film cartridge positioning device according to claim 13 wherein said power receiving portion and said positioning portion are integrally formed.

* * * * *